(12) United States Patent
Sridharan et al.

(10) Patent No.: US 9,424,144 B2
(45) Date of Patent: Aug. 23, 2016

(54) VIRTUAL MACHINE MIGRATION TO MINIMIZE PACKET LOSS IN VIRTUALIZED NETWORK

(75) Inventors: Murari Sridharan, Sammamish, WA (US); Narasimhan A. Venkataramaiah, Redmond, WA (US); Yu-Shun Wang, Bellevue, WA (US); Christopher W. McCarron, Hartford, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 13/192,254

(22) Filed: Jul. 27, 2011

(65) Prior Publication Data

US 2013/0031544 A1 Jan. 31, 2013

(51) Int. Cl.
| | |
|---|---|
| G06F 9/455 | (2006.01) |
| G06F 9/46 | (2006.01) |
| G06F 11/14 | (2006.01) |
| G06F 11/20 | (2006.01) |

(52) U.S. Cl.
CPC ........ *G06F 11/1484* (2013.01); *G06F 9/45558* (2013.01); *G06F 11/203* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,680,919 B2 | 3/2010 | Nelson | |
| 2003/0069016 A1* | 4/2003 | Bahl et al. | 455/432 |
| 2003/0140193 A1 | 7/2003 | Acharya et al. | |
| 2004/0174887 A1 | 9/2004 | Lee | |
| 2005/0063393 A1 | 3/2005 | Lin | |
| 2007/0006286 A1* | 1/2007 | Singhal | 726/4 |
| 2007/0061462 A1* | 3/2007 | Kim et al. | 709/226 |
| 2007/0079307 A1* | 4/2007 | Dhawan et al. | 718/1 |
| 2007/0266383 A1 | 11/2007 | White | |
| 2007/0283348 A1 | 12/2007 | White | |

(Continued)

FOREIGN PATENT DOCUMENTS

| | | |
|---|---|---|
| CN | 1993942 A | 7/2007 |
| EP | 2309680 A1 | 4/2011 |

(Continued)

OTHER PUBLICATIONS

Live migration of Virtual Machines: Sustaining active TCP-sessions—Published Date: Sep. 3, 2009.

(Continued)

*Primary Examiner* — Abdullah Al Kawsar
*Assistant Examiner* — Bradley Teets
(74) *Attorney, Agent, or Firm* — Judy Yee; Micky Minhas

(57) ABSTRACT

Methods and apparatus are provided for controlling live migration of a virtual machine from a first host to a second host in a data center. A virtual machine manager may distribute to at least one host in a virtual network an updated mapping policy that maps a customer address of the virtual machine to a provider address of the migrated virtual machine. The updated mapping policy enables hosts in the virtual network to communicate with the migrated virtual machine. The updated mapping policy can be a shadow policy. The shadow policy is transmitted to hosts in the virtual network by the virtual machine manager before live migration of the virtual machine completes and is maintained by recipient hosts in an inactive state until triggered. The virtual machine manager notifies hosts in the virtual network to activate the shadow policy when live migration completes.

17 Claims, 16 Drawing Sheets

(56) References Cited

U.S. PATENT DOCUMENTS

| | | | |
|---|---|---|---|
| 2008/0098127 A1 | 4/2008 | Engel | |
| 2008/0270564 A1 | 10/2008 | Rangegowda et al. | |
| 2009/0327471 A1 | 12/2009 | Astete et al. | |
| 2010/0031253 A1 | 2/2010 | Adams et al. | |
| 2010/0071025 A1 | 3/2010 | Devine et al. | |
| 2010/0153514 A1 | 6/2010 | Dabagh et al. | |
| 2010/0205252 A1 | 8/2010 | Dorai et al. | |
| 2010/0287548 A1* | 11/2010 | Zhou et al. | 718/1 |
| 2010/0306408 A1 | 12/2010 | Greenberg et al. | |
| 2010/0325634 A1* | 12/2010 | Ichikawa et al. | 718/103 |
| 2011/0035494 A1 | 2/2011 | Pandey et al. | |
| 2011/0075664 A1 | 3/2011 | Lambeth et al. | |
| 2011/0185082 A1 | 7/2011 | Thompson | |
| 2012/0099602 A1 | 4/2012 | Nagapudi et al. | |
| 2012/0311568 A1 | 12/2012 | Jansen | |

FOREIGN PATENT DOCUMENTS

| | | |
|---|---|---|
| JP | H1051449 A | 2/1998 |
| JP | 2007096932 A | 4/2007 |
| JP | 2010114665 A | 5/2010 |
| WO | 2006/013191 A1 | 2/2006 |

OTHER PUBLICATIONS

Virtual Routers on the Move: Live Router Migration as a Network-Management Primitive—Published Date: Aug. 17, 2008.

The Efficacy of Live Virtual Machine Migrations over the Internet—Published Date: Nov. 12, 2007.

Migrating Xen Virtual Routers with no Packet Loss—Retrieved Date: Mar. 30, 2011.

Live Migration in Windows Server 2008 R2 Hyper-V—Retrieved Date: Mar. 30, 2011.

Girola, et al., "IBM Data Center Networking: Planning for Virtualization and Cloud Computing"—Published Date: Feb. 10, 2011, IBM.com/Redbooks.

Nicira, et al., "Virtualizing the Network Forwarding Plane", Published Date: Nov. 30, 2010, yuba.stanford.edu/~casado/virt-presto.pdf.

"Cisco Virtualized Multi-Tenant Data Center, Version 2.0—Compact Pod Design Guide"—Published Date: Oct. 20, 2010.

Pfaff, et al., "Extending Networking into the Virtualization Layer", SigComm Conference, Oct. 2009.

"Virtualization, Isolation and Encryption of IP Video Surveillance"—Retrieved Date: Mar. 29, 2011, Cisco: IP Video Surveillance Whitepapers.

"New VMware vShield™ Zones to Deliver Security and Compliance Across the Datacenter"—Feb. 24, 2009, VMware News Releases, Cannes, France.

"Search Report Issued in European Patent Application No. 11870021.0", Mailed Date: Dec. 4, 2014, 9 Pages.

"First Office Action and Search Report Issued in Chinese Patent Application No. 201180072594.1", Mailed Date: Sep. 2, 2015, 12 Pages.

"Office Action Issued in Japanese Patent Appl. No. 2014-522809", Mailed Date: Feb. 23, 2016, 6 Pages.

"Office Action Issued in Chinese Patent Appl. No. 201180072594.1", Mailed Date: Jun. 7, 2016, 4 Pages.

* cited by examiner

VIRTUAL MACHINE MIGRATION TO MINIMIZE PACKET LOSS IN VIRTUALIZED NETWORK

FIELD OF THE INVENTION

This invention relates to live migration of a virtual machine from a first host system to a second host system and, more particularly, to methods and apparatus for limiting packet loss during and following live migration of a virtual machine.

BACKGROUND OF INVENTION

Data centers may include several hundred or several thousand servers interconnected by high speed switches and routers. Cloud data centers may provide a variety of services, such as web applications, e-mail services, search engine services, etc., for a plurality of customers. In recent years, data centers have transformed computing, with large scale consolidation of enterprise IT into data center hubs and with the emergence of cloud computing service providers.

Virtual machine (VM) technology allows one or more operating systems, or virtual machines, to run concurrently on one physical host system. The advantages of virtual machine technology have become widely recognized. Among these advantages is the ability to run multiple virtual machines on a single host system.

Live migration allows the transfer of a running virtual machine from one host system to another host system without significant disruption of the operating system running in the virtual machine. The goal for live migration is to avoid significant disruption of the running virtual machine. However, some packet loss is acceptable during live migration.

There are a number of reasons for live migration of a virtual machine. These include an increase in the load on the host system currently hosting the virtual machine, the occurrence of a fault in the host system and the temporary unavailability of the host system for hosting a virtual machine due to planned or unplanned maintenance.

During live migration it is desirable to maintain active connections between the migrating virtual machine and other virtual machines. In a virtualized network where each customer address is mapped to a provider address, the changing of the provider address of the migrating virtual machine will cause packets to be dropped because the other virtual machines still have a stale address mapping. Packet loss for extended periods of time will cause the connections to break due to timeouts.

SUMMARY OF THE INVENTION

The present invention provides methods and apparatus for controlling live migration of a virtual machine from a first host to a second host in a data center. In some embodiments, a virtual machine manager efficiently distributes to at least one host in a virtual network an updated mapping policy that maps a customer address of the virtual machine to a provider address of the migrated virtual machine. The updated mapping policy enables hosts in the virtual network to communicate with the migrated virtual machine.

In some embodiments, the updated mapping policy is a shadow policy. The shadow policy is transmitted to hosts in the virtual network by the virtual machine manager before live migration of the virtual machine completes and is maintained by recipient hosts in an inactive state until triggered. The virtual machine manager may notify hosts in the virtual network to activate the shadow policy when live migration completes.

A host receiving the shadow policy uses a current mapping policy for communicating with the virtual machine until the shadow policy is activated, and uses the shadow policy for communicating with the virtual machine after the shadow policy is activated. In some cases, the shadow policy is activated in response to a notification received from the virtual machine manager that live migration is complete. In other cases, the host activates the shadow policy in response to receiving from the migrated virtual machine a packet that matches the shadow policy.

In further embodiments, the first host forwards packets addressed to the virtual machine according to a forwarding policy until all hosts in the virtual network have received the updated mapping policy. When the first host receives a notification that all hosts in the virtual network have received the updated mapping policy, the forwarding policy is deactivated.

In further embodiments, the first host may request the virtual machine manager to send the updated mapping policy to a third host in response to receiving from the third host a packet sent in accordance with a stale mapping policy. These embodiments perform reactive policy updating according to a "lazy push" technique.

In further embodiments, a third host may request the virtual machine manager to send an updated mapping policy in response to receiving from the migrated virtual machine a packet that does not match a current mapping policy. These embodiments perform reactive policy updating according to a "lazy pull" technique.

In further embodiments, the first host may send the updated mapping policy directly to one or more other hosts in the virtual network. The updated mapping policy may be sent by the first host in response to receiving a packet that does not match the updated mapping policy or upon request by one of the other hosts in the virtual network.

According to an aspect of the invention, a method is provided for controlling live migration of a virtual machine from a first host to a second host. The method comprises determining, by a virtual machine manager, that the virtual machine will be migrated from the first host to the second host; and sending, by the virtual machine manager to at least a third host in a virtual network including the virtual machine, an updated mapping policy that maps a customer address of the virtual machine to a provider address of the migrated virtual machine on the second host.

According to another aspect of the invention, a method is provided for controlling live migration of a virtual machine from a first host to a second host. The method comprises receiving, by a third host, a shadow mapping policy that maps a customer address of the virtual machine to a provider address of the migrated virtual machine on the second host; using, by the third host, a current mapping policy for communicating with the virtual machine until the shadow mapping policy is activated; and using, by the third host, the shadow mapping policy for communicating with the virtual machine after the shadow mapping policy is activated.

According to a further aspect of the invention, a virtual machine manager is provided for controlling live migration of a virtual machine from a first host to a second host in a data center. The virtual machine manager comprises a processing device and a storage device encoded with instructions that, when executed by the processing device, are configured to determine that the virtual machine will be migrated from the first host to the second host, and to send to at least a third host in a virtual network including the virtual machine, an updated mapping policy that maps a customer address of the virtual machine to a provider address of the migrated virtual machine on the second host.

BRIEF DESCRIPTION OF DRAWINGS

For a better understanding of the present invention, reference is made to the accompanying drawings, which are incorporated herein by reference and in which.

DETAILED DESCRIPTION

Figure 1:
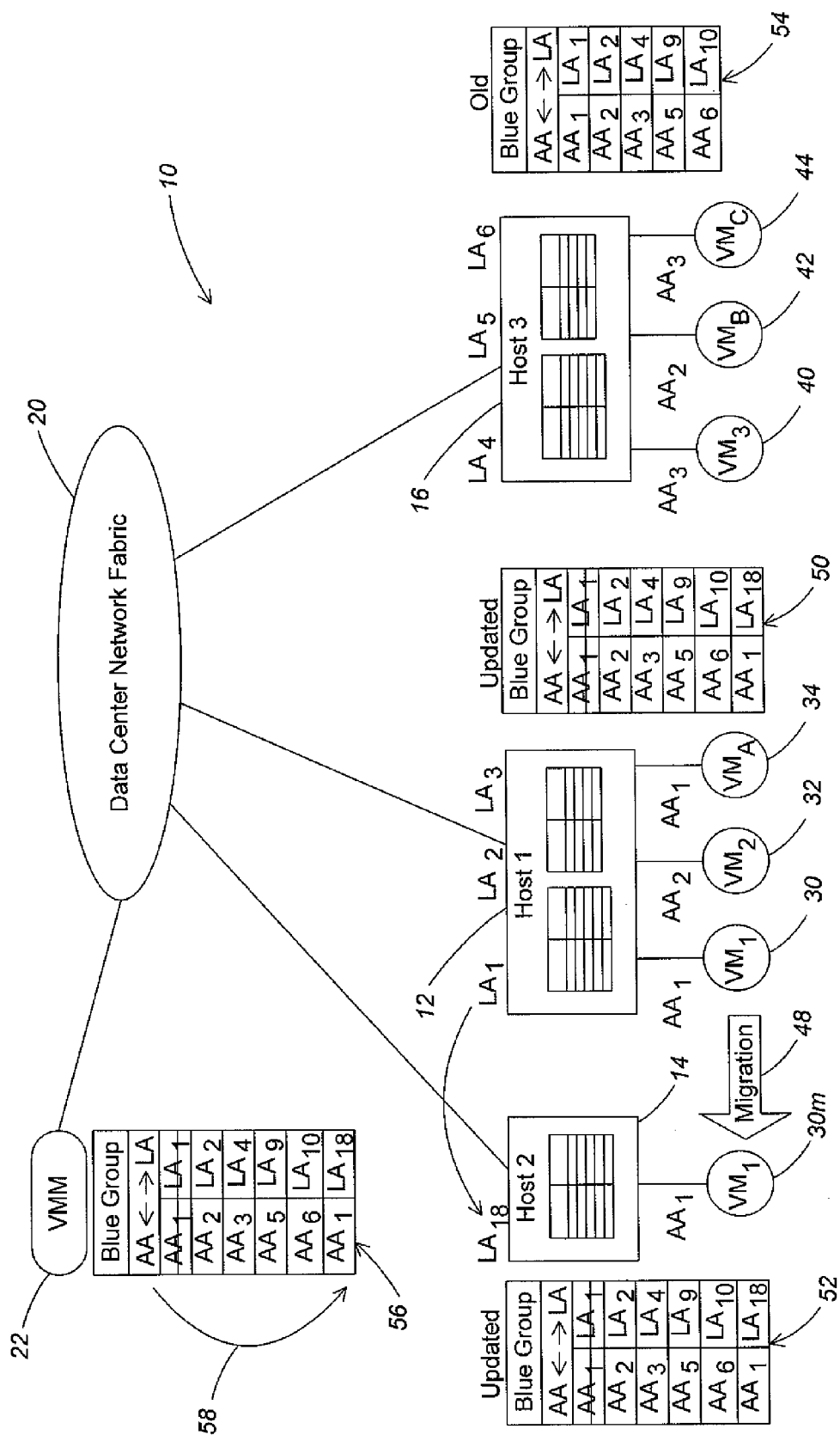
FIG. 1 is a schematic block diagram of a data center, illustrating live migration of a virtual machine.

A simplified schematic block diagram of a data center incorporating features of the present invention is shown in FIG. 1. A data center 10 may include a first host 12, a second host 14 and a third host 16 interconnected by a data center network fabric 20. As used herein, the term "host" refers to a physical machine, typically a server or other computing device as shown for example in FIG. 16 and described below. The data center 10 further includes a virtual machine manager 22. Included in the tasks of virtual machine manager 22 is controlling live migration of virtual machines as described below.

Each of the hosts in data center 10 may host one or more virtual machines (VM), which may include a complete operating system capable of running applications independently of other virtual machines. As shown in FIG. 1, first host 12 hosts virtual machines 30, 32 and 34, second host 14 hosts virtual machine 30m after live migration, and third host 16 hosts virtual machines 40, 42 and 44. As discussed below, virtual machine 30 is transferred by live migration from first host 12 to second host 14.

Each of the hosts in data center 10 may include a switch to route data packets to and from the virtual machines in the host. In the case of a single virtual machine, a switch may not be required. Each of the virtual machines may include a network adapter for external communication via the host in which it resides. Each of the hosts further includes software for controlling live migration, for updating mapping policy tables, and for packet forwarding as described below, as well as other tasks not relevant to the present invention.

In the example of FIG. 1, virtual machines 30, 32 and 40 are part of a first virtual network, or isolation group, and virtual machines 34, 42 and 44 are part of a second virtual network, or isolation group. The two virtual networks may correspond to two different customers of the data center and are isolated from each other, even though virtual machines of the two virtual networks may be hosted by the same host.

As further shown in FIG. 1, each virtual machine is associated with a customer address AA (application address) and a provider address LA (location address). The customer address AA corresponds to the IP address of the virtual machine, and the provider address LA corresponds to the physical location of the virtual machine in one of the hosts. The provider address LA changes as a result of live migration, whereas the customer address AA remains fixed. Thus, for example, virtual machine 32 in first host 12 has a customer address $AA_2$ and a provider address $LA_2$. Two or more virtual machines in different virtual networks may have the same customer address AA, but the provider address LA of each virtual machine is unique. Together, the customer address $AA_2$ and the provider address $LA_2$ form an address pair $AA_2$:$LA_2$, which defines a mapping policy for virtual machine 32. The mapping policy is used in communication between virtual machines in a virtual network as discussed below.

A number of mapping policies for a virtual network may be grouped to form a virtual network policy, such as virtual network policy 50 shown in FIG. 1. The policy 50 resides in first host 12 and is associated with the first virtual network, which includes virtual machines 30, 32 and 40 and may include other virtual machines (not shown). Each entry in policy 50 includes a mapping policy comprising the customer address AA and the provider address LA of a virtual machine. Each entry in the virtual network policy may include additional information as needed. As further shown in FIG. 1, second host 14 includes a virtual network policy 52, third host 16 includes a virtual network policy 54, and virtual machine manager 22 includes a virtual network policy 56. In the absence of live migration, policies 50, 52 and 54 contain current mapping information. The updating of policies in connection with live migration is discussed below. It will be understood that each virtual network policy may have any structure, such as a table, that contains the mapping information.

As noted above, virtual network policy 50 includes a mapping policy for each virtual machine in the first virtual network. Additional virtual network policies correspond to additional virtual networks. For example, separate policies in first host 12 and in third host 16 contain mapping policies for the second virtual network including virtual machines 34, 42 and 44.

As further shown in FIG. 1, virtual machine 30 is transferred by live migration, as indicated by arrow 48, from first host 12 to second host 14 to become migrated virtual machine 30m. Live migration allows the transfer of a running virtual machine from one host to another host without significant disruption of the operation of the virtual machine. The live migration may be controlled by virtual machine manager 22.

Figure 2:
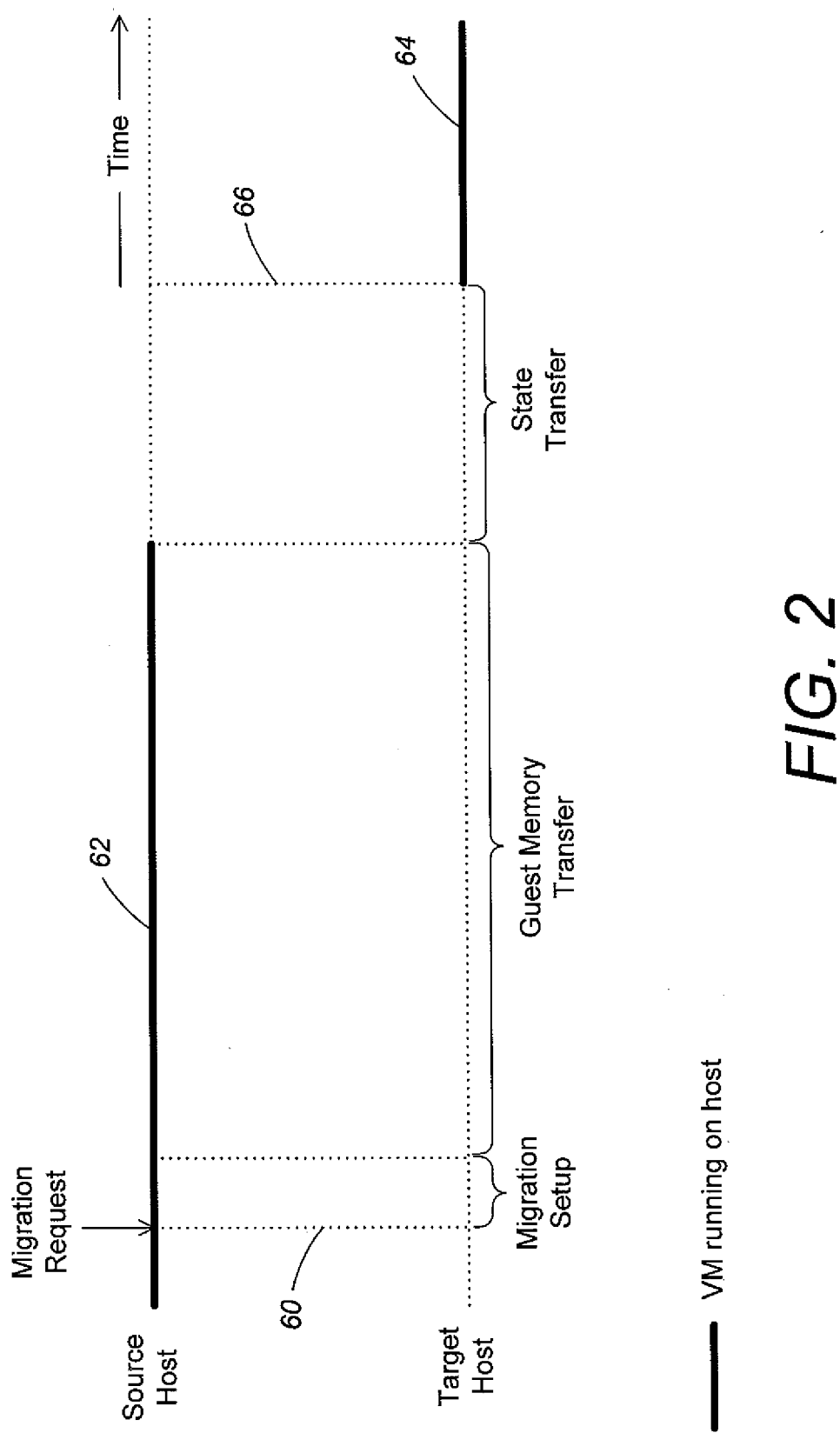
FIG. 2 is a simplified timeline of live migration.

A simplified timeline of live migration is shown in FIG. 2. A migration request is made at time 60. A live migration includes migration setup, guest memory transfer and state transfer. Details of live migration techniques are known in the art and are not described in detail. During migration setup and guest memory transfer, the virtual machine 30 is running on first host 12 (the source host) as indicated by upper line 62 in FIG. 2. During state transfer, operation of the virtual machine is interrupted. Then, upon completion of state transfer, the migrated virtual machine 30m runs on second host 14 (the target host), as indicated by lower line 64 in FIG. 2. The live migration is complete at time 66.

At the time when the virtual machine is running on the target host, as indicated by line 64, the virtual machine is able to send and receive packets. However, some or all of the hosts in the virtual network may have an outdated, or stale, mapping policy. In particular, the customer address $AA_1$ of migrated virtual machine 30m remains unchanged, but the provider address of migrated virtual machine 30m changes from provider address $LA_1$ to provider address $LA_{18}$ in the example of FIG. 1. The new provider address $LA_{18}$ of virtual machine 30m must be reflected in the policy table of each host of the virtual network in order to avoid packet loss. In one example, virtual machine 40 in third host 16 may attempt to send a packet to virtual machine 30 at provider address $LA_1$ using the stale mapping policy in policy table 54. In the absence of packet forwarding as described below, the packet would be lost. In another example, a packet sent by migrated virtual machine 30m from physical address $LA_{18}$ to virtual machine 40 in third host 16 may be discarded by third host 16 because the received packet does not match the stale mapping policy in policy table 54.

Figure 3:
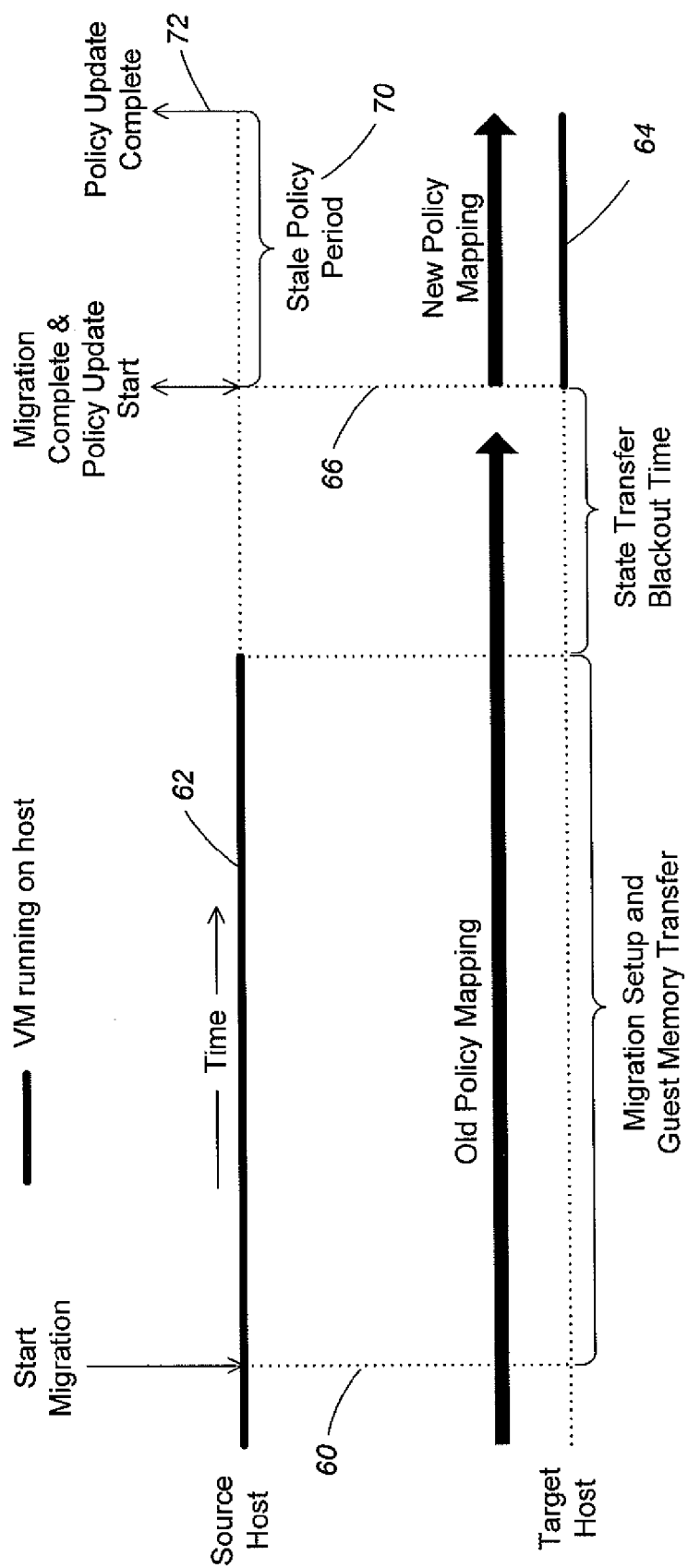
FIG. 3 is a simplified timeline of live migration, illustrating mapping policy updates.

Accordingly, the mapping policy in each of the hosts in the virtual network is updated to reflect the live migration. As shown in FIG. 3, the current mapping policy remains in effect during live migration at least until live migration is complete at time 66. Upon completion of live migration at time 66, an updated mapping policy can be put into effect. However, due to network delays and other factors, it is not feasible to complete the policy update immediately upon completion of live migration. Accordingly, a stale policy period 70 is experienced during which policy updates are being performed. When the policy update is complete at time 72, normal operation can be resumed. It is desirable to limit the length of stale policy period 70 in order to limit packet loss.

In the example of FIG. 1, first host 12 may be considered the source host for the live migration, and second host 14 may be considered the target host. It will be understood that a virtual machine may be subjected to live migration more than once and that different virtual machines may be subjected to live migration at different times. The mapping policies in the hosts of a virtual network are updated to reflect each of the live migrations. Updating of virtual network policy 56 in virtual machine manager 22 is illustrated by arrow 58, where mapping policy $AA_1$:$LA_1$ is replaced by updated mapping policy $AA_1$:$LA_{18}$.

Figure 4:
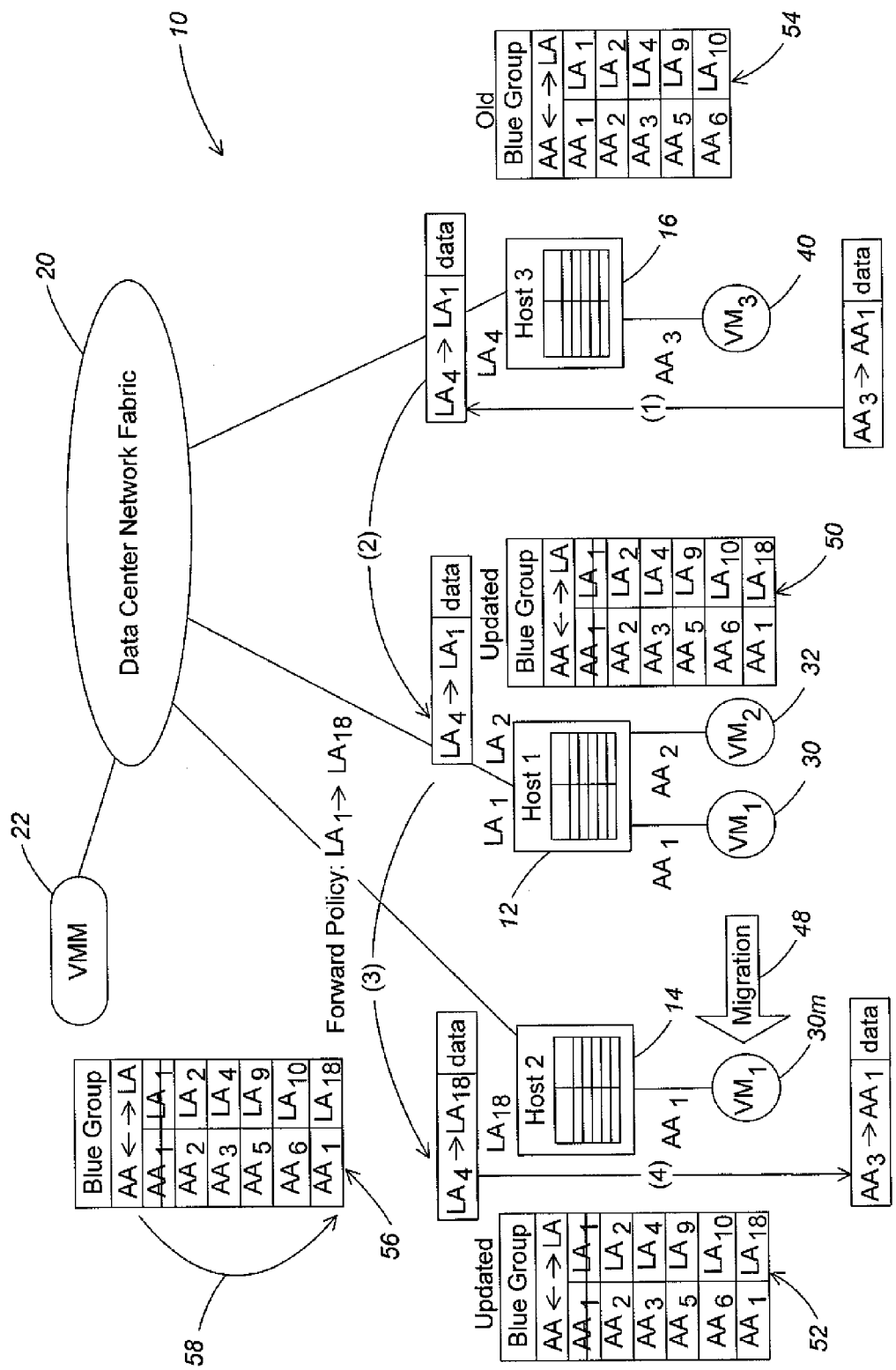
FIG. 4 is a schematic block diagram of a data center, illustrating forward packet delivery.
Figure 5:
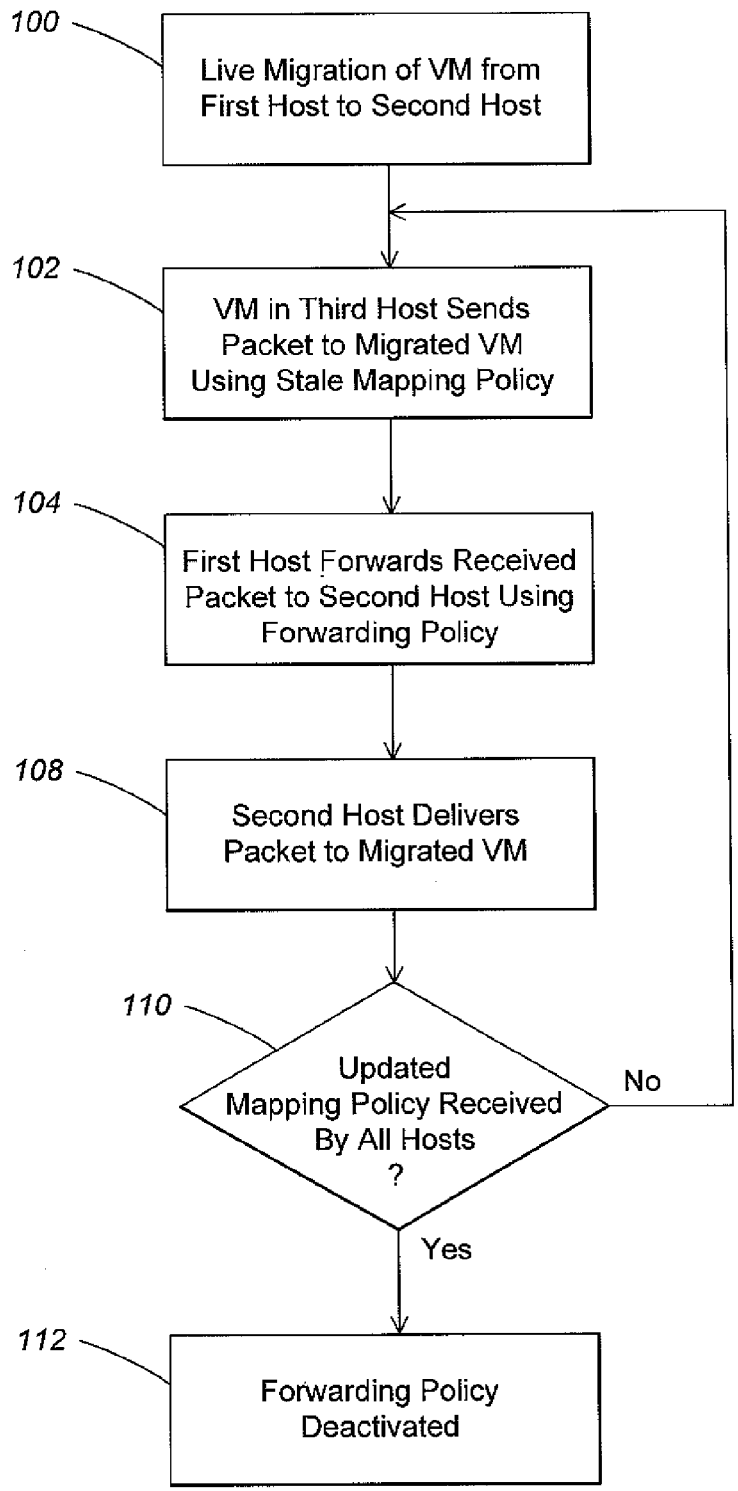
FIG. 5 is a flowchart that illustrates forward packet delivery.

FIG. 4 is a simplified schematic diagram of data center 10, illustrating forward packet delivery following live migration of virtual machine 30. In FIG. 4, the virtual machines of the second virtual network have been omitted for simplicity. FIG. 5 is a flowchart of a process for forward packet delivery. In FIG. 4, it is assumed that virtual network policy 50 of first host 12, virtual network policy 52 of second host 14 and virtual network policy 56 of virtual machine manager 22 have been updated to reflect the live migration of virtual machine 30 from first host 12 to second host 14. The virtual network policy 54 in third host 16 is stale, i.e. has not been updated to reflect the live migration of virtual machine 30.

Referring to FIG. 5, live migration of virtual machine 30 from first host 12 to second host 14 is performed in act 100. In act 102, virtual machine 40 in third host 16 sends a packet to virtual machine 30 (arrow (1) in FIG. 4). Virtual machine 40 uses the customer address $AA_1$ of virtual machine 30. The packet includes an address field indicating that the virtual machine at customer address $AA_3$ is sending a packet to the virtual machine at customer address $AA_1$. Third host 16 converts the customer address of virtual machine 30 to a provider address $LA_1$ according to the stale mapping policy in policy table 54. The packet includes an address field indicating that the virtual machine at provider address $LA_4$ is sending a packet to the virtual machine at provider address $LA_1$. The packet is sent by third host 16 to first host 12 (arrow (2) in FIG. 4), again according to the stale mapping policy in policy table 54, which does not reflect the migration of virtual machine 30 from first host 12 to second host 14.

In act 104, the first host 12 recognizes the packet received from third host 16 as having been sent in accordance with a stale mapping policy. In response, the first host 12 modifies the address field of the received packet to reflect the provider address $LA_{18}$ of migrated virtual machine 30m and forwards the received packet to second host 14 (arrow (3) in FIG. 4) using a forwarding policy that is in effect until all mapping policies have been updated. In act 108, second host 14 translates the destination address of the received packet and routes the packet to migrated virtual machine 30m (arrow (4) in FIG. 4). The address field of the packet received by virtual machine 30 indicates that the packet was received from virtual machine 40 having customer address $AA_3$.

In act 110, first host 12 determines if the updated mapping policy has been received by all hosts in the virtual network. This may be determined, for example, based on a notification received from virtual machine manager 22. Until all hosts in the virtual network have been updated, the first host 12 continues to forward packets addressed to migrated virtual machine 30m. The packets may be received from third host 16 or from other hosts (not shown) in the virtual network. In act 112, when all hosts in the virtual network have received the updated mapping policy, the forwarding policy is deactivated by first host 12.

Figure 6:
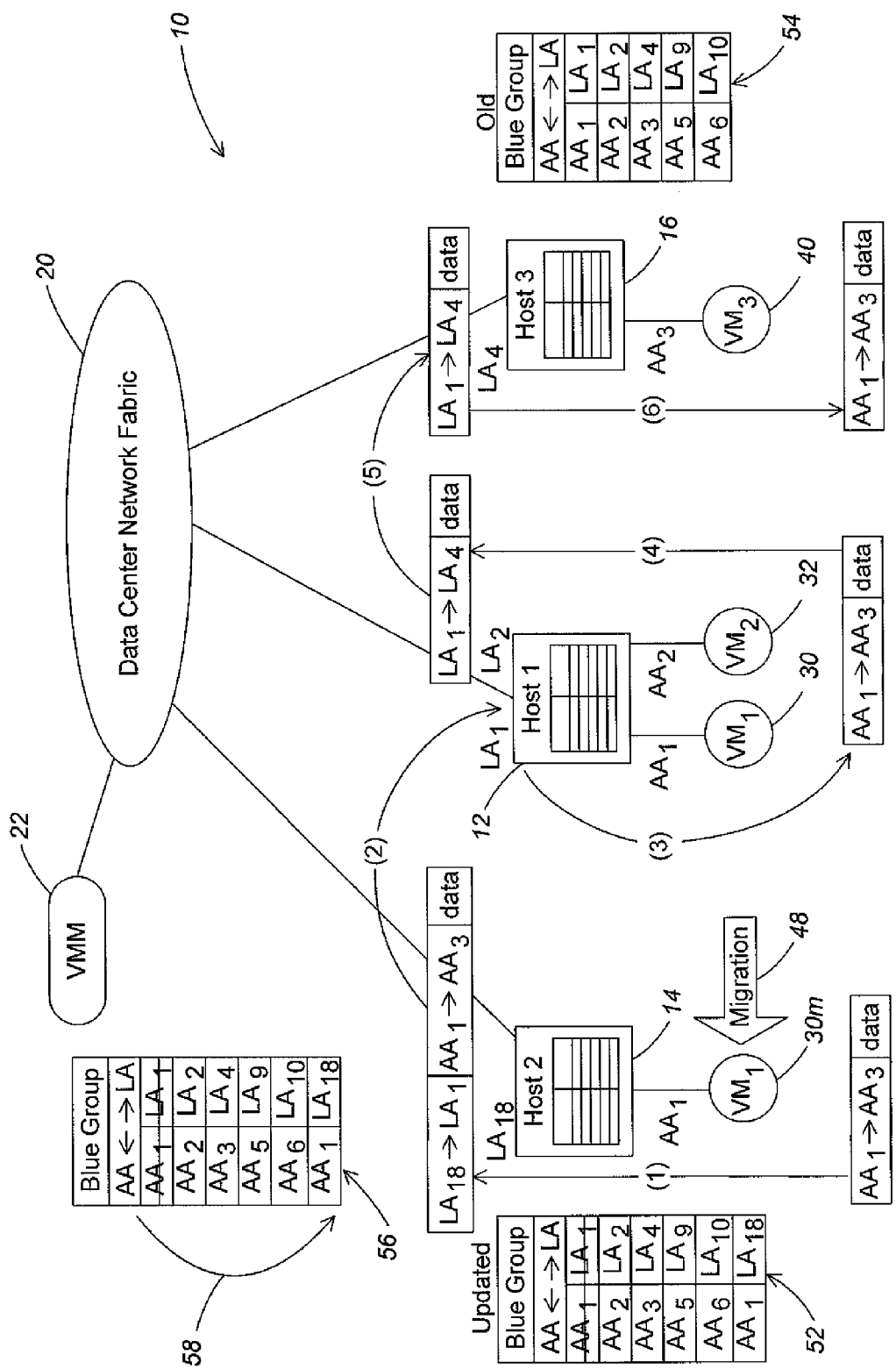
FIG. 6 is a schematic block diagram of a data center, illustrating reverse tunneling.
Figure 7:
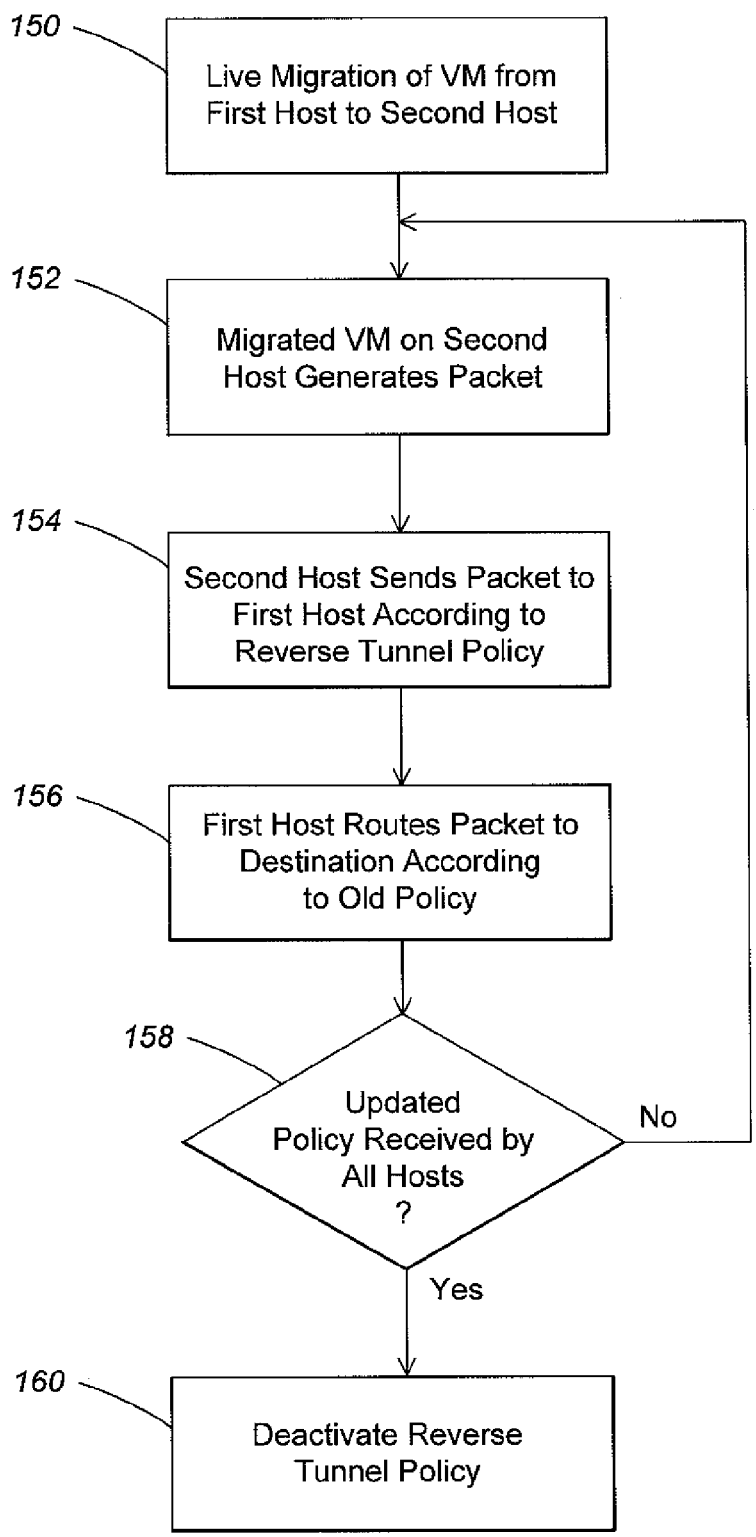
FIG. 7 is a flowchart that illustrates reverse tunneling.

FIG. 6 is a simplified schematic block diagram of data center 10, illustrating forwarding by reverse tunneling following live migration. The components of data center 10 in FIG. 6 correspond with the components of data center 10 shown in FIG. 4. A flow diagram of reverse tunneling is shown in FIG. 7. It is assumed that first host 12, second host 14 and virtual machine manager 22 have updated mapping policies that reflect the migration of virtual machine 30 from first host 12 to second host 14. The mapping policy in virtual network policy 54 of third host 16 is stale and does not reflect the migration of virtual machine 30.

In act 150, first host 12 and second host 14 determine that virtual machine 30 has migrated from first host 12 to second host 14. However, first host 12 and second host 14 have not received notification that the mapping policies in all hosts in the virtual network have been updated. In act 152, migrated virtual machine 30m sends a packet to virtual machine 40 in third host 16 (arrow (1) in FIG. 6). The address field of the packet indicates that the packet is addressed from the customer address $AA_1$ of migrated virtual machine 30m to customer address $AA_3$ of virtual machine 40. In act 154, second host 14 adds the provider address $LA_{18}$ of migrated virtual machine 30m and the provider address $LA_1$ of virtual machine 30 prior to live migration. The packet is thereby sent by second host 14 to first host 12 at provider address $LA_1$ (arrow (2) in FIG. 6) using a reverse tunneling policy that is in effect until all virtual network policies have been updated.

In act 156, first host 12 translates the destination address of the packet received from second host 14 to provide a packet addressed from customer address $AA_1$ of virtual machine 30 to customer address $AA_3$ of virtual machine 40 (arrow (3) in FIG. 6). The packet is then routed to the destination address using the stale mapping policy (arrow (4) in FIG. 6). In particular, the address field of the packet is modified to reflect the old provider address $LA_1$ of virtual machine 30 and the provider address $LA_4$ of virtual machine 40. The packet is sent from first host 12 to third host 16 (arrow (5) in FIG. 6) and is recognized as matching the stale mapping policy in virtual network policy 54. The packet is then delivered by third host 16 to virtual machine 40 (arrow (6) in FIG. 6). The packet received by third host 16 appears to have been received from virtual machine 30 in first host 12 according to the stale mapping policy and is accepted. By contrast, if the packet received by third host 16 had been received from physical address $LA_{18}$ in second host 14, the packet would have been discarded as not matching the stale mapping policy then in effect.

In act 158, the first host 12 and the second host 14 determine if the updated mapping policy has been received by all hosts in the virtual network. This may be determined, for example, based on a notification received from virtual machine manager 22. Until all hosts in the virtual network have received the updated mapping policy, the process returns to act 152, to continue reverse tunneling operation. If the first host 12 and the second host 14 determine that the updated mapping policy has been received by all hosts, the reverse tunneling policy is deactivated in act 160.

Figure 8:
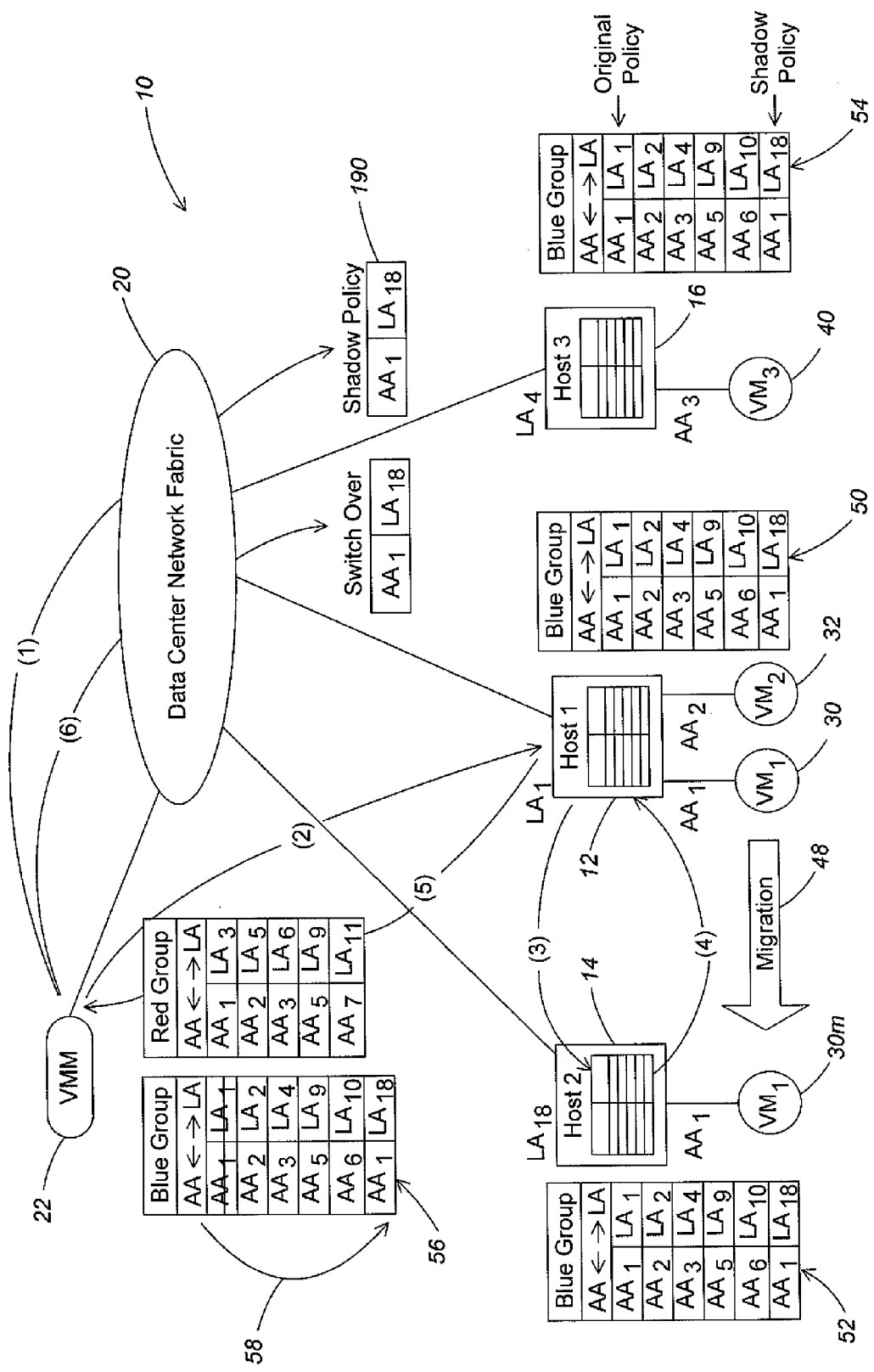
FIG. 8 is a schematic block diagram of a data center, illustrating the use of a shadow mapping policy.
Figure 9:
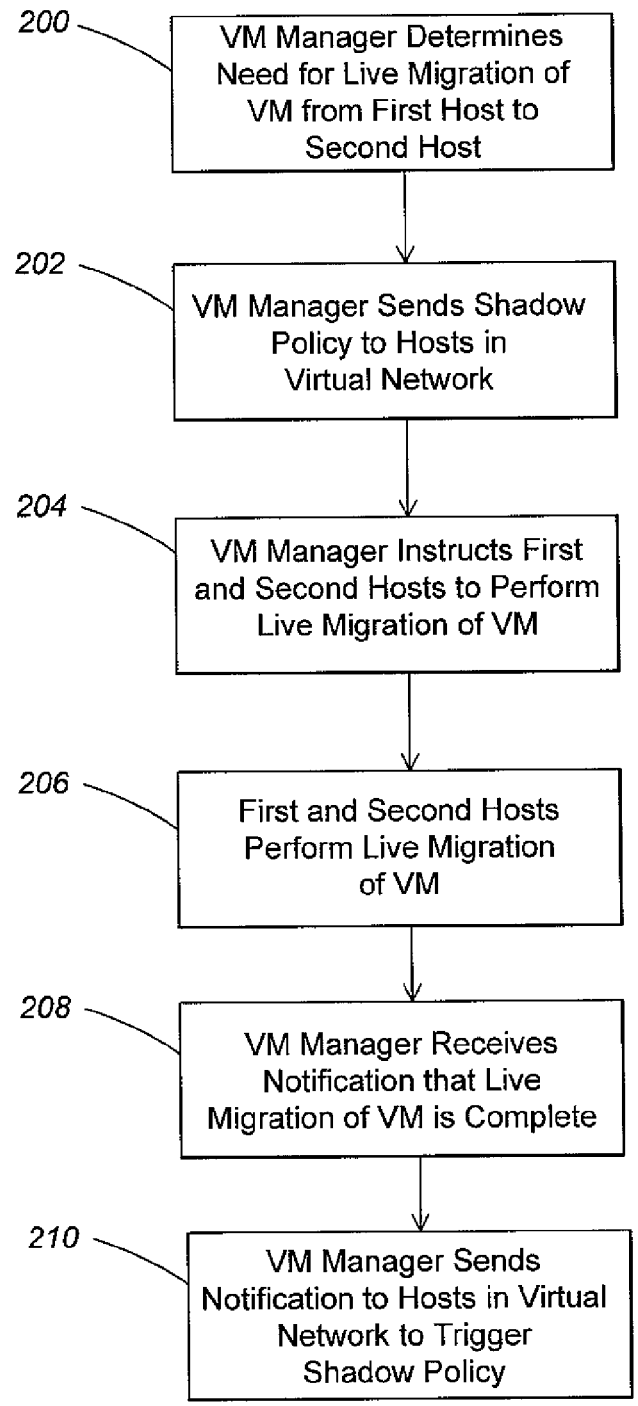
FIG. 9 is a flowchart of a process performed by a virtual machine manager in provisioning a shadow mapping policy.
Figure 10:
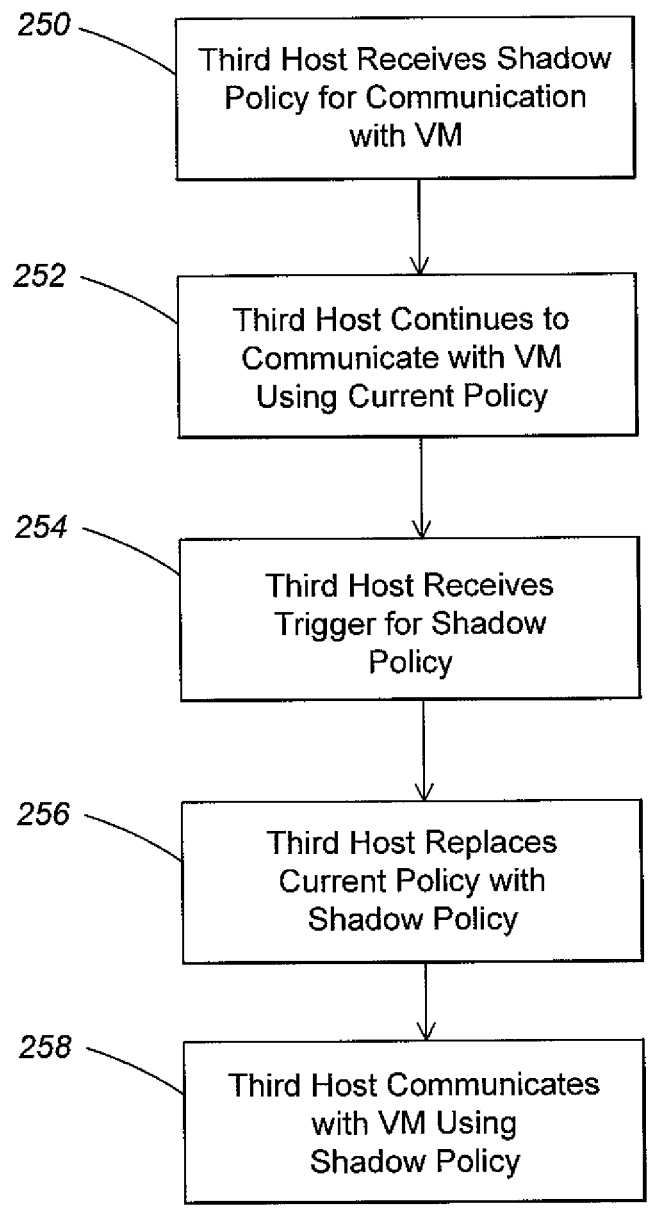
FIG. 10 is a flowchart of a process performed by a third host in utilizing the shadow mapping policy.

FIG. 8 is a simplified schematic block diagram of data center 10, illustrating the use of a shadow mapping policy. Components of data center 10 in FIG. 8 correspond with the components of data center 10 shown in FIG. 4. A flow diagram of use of a shadow mapping policy by virtual machine manager 22 is shown in FIG. 9. A flow diagram of use of the shadow mapping policy by third host 16 is shown in FIG. 10.

Referring to FIG. 9, operations by virtual machine manager 22 are shown. In act 200, the virtual machine manager 22 determines a need for live migration of virtual machine 30 from first host 12 to second host 14. In some embodiments, the virtual machine manager 22 directs first host 12 and second host 14 to perform live migration of virtual machine 30. In other embodiments, live migration may be performed under control of first host 12 and second host 14. In either case, virtual machine manager 22 is aware of events during the migration, including but not limited to start of the live migration and completion of the live migration.

In act 202, the virtual machine manager 22 sends a shadow mapping policy to the hosts in the virtual network which includes virtual machine 30 (arrow (1) in FIG. 8). The shadow mapping policy is not sent to any hosts outside the virtual network. The shadow mapping policy, referred to for simplicity as "shadow policy", is a mapping policy which defines a mapping between the customer address AA of virtual machine 30 and the provider address LA of virtual machine 30 after completion of live migration. In the example of FIG. 8, a shadow policy 190 includes customer address $AA_1$ and provider address $LA_{18}$ and is denoted as $AA_1:LA_{18}$. The shadow policy 190 is identified by virtual machine manager 22 when sent to the virtual network hosts as being a shadow policy which is to be stored by each host but is not to be utilized until triggered. For example, the shadow policy may include a shadow policy flag which indicates that the policy is a shadow policy. Each host stores the shadow policy and identifies the stored shadow policy as being inactive.

In act 204, virtual machine manager 22 instructs first host 12 and second host 14 to perform live migration of virtual machine 30 (arrow (2) in FIG. 8). In act 206, first host 12 and second host 14 perform live migration of virtual machine 30 (arrows (3) and (4) in FIG. 8) as illustrated in FIG. 2 and described above. The degree of control of live migration by virtual machine manager 22 may vary within the scope of the invention.

In step 208, the virtual machine manager 22 receives notification that the live migration of virtual machine 30 is complete (arrow (5) in FIG. 8). The completion corresponds to time 66 in FIG. 3. Until live migration is complete, each of the hosts in the virtual network uses its current mapping policy for communication with virtual machine 30 and maintains the shadow policy 190 in an inactive state.

In act 210, the virtual machine manager 22 sends a notification to the hosts in the virtual network to trigger the shadow policy 190 (arrow (6) in FIG. 8). Upon receiving the notification to trigger the shadow policy, each of the hosts discontinues use of the current mapping policy and begins using the shadow policy for communication with migrated virtual machine 30m. In the event of live migration failure, the virtual machine manager 22 may notify the hosts in the virtual network of the failure. The hosts remove the shadow policy and continue to use the current mapping policy.

The virtual machine manager 22 preferably sends the shadow policy to the hosts in the virtual network in act 202 prior to completion of live migration. This enables the shadow policy to be triggered relatively quickly upon completion of live migration. It will be understood that the shadow policy can be sent by the virtual machine manager 22 to the hosts in the virtual network at any time after it becomes aware of the new physical address of the virtual machine being migrated.

A process performed by third host 16 in using the shadow policy is shown in FIG. 10. In act 250, third host 16 receives shadow policy 190 from virtual machine manager 22. As indicated above, shadow policy 190 includes the customer address $AA_1$ and provider address $LA_{18}$ of virtual machine 30 after live migration. The shadow policy 190 enables communication with migrated virtual machine 30m after completion of live migration. The shadow policy 190 is stored by third host 16, for example in virtual network policy 54, but is identified as being inactive.

In act 252, third host continues to communicate with virtual machine 30 using the current mapping policy, which maps virtual machine 30 to provider address $LA_1$ in first host 12. Packets sent by virtual machine 40 to virtual machine 30 during this time can be forwarded by first host 12 as described above.

In act 254, third host 16 receives a trigger to activate shadow policy 190. In some cases, the trigger to activate shadow policy 190 can be received from virtual machine manager 22. The trigger can be in the form of a notification from virtual machine manager 22 to activate shadow policy 190. In other cases, the shadow policy 190 is activated automatically when third host 16 receives a packet that matches shadow policy 190. In the absence of shadow policy 190, the packet would be discarded, but the shadow policy permits the received packet to be accepted. In these cases, the received packet serves as a trigger to activate the shadow policy in a so-called reactive activation. That is, the host reacts to a received packet that matches the shadow policy by activating the shadow policy and deactivating the now-stale current mapping policy. In the event that a trigger is not received, the lapse of an expiration time for the shadow policy causes the removal of the shadow policy from third host 16. In this case, third host 16 continues to use the current mapping policy.

The shadow policy may be activated by reactive activation or in response to notification by the virtual machine manager 22. Reactive activation makes notification by the virtual machine manager 22 less time-critical. In addition, the forwarding policy is no longer needed for a particular path between a source host and a destination host once the source host has activated the shadow policy. The reverse tunneling policy is typically not used with the shadow policy, since reverse tunneling would prevent reactive activation of the shadow policy. In cases where there is packet traffic from the migrated virtual machine to a particular host, the shadow policy is automatically activated by that host in response to receipt of a packet from the migrated virtual machine, thereby avoiding packet loss and eliminating the need for notification by the virtual machine manager 22. In cases where there is no packet traffic from the migrated virtual machine to a particular host, the virtual machine manager can send a notification to that host to activate its shadow policy. However, the notification is not time-critical in the absence of packet traffic.

In act 256, the third host 16 replaces the current mapping policy for virtual machine 30 with the shadow policy 190. The third host 16 effectively deactivates the current mapping policy and activates the shadow mapping policy with respect to migrated virtual machine 30m. In act 258, the third host 16 communicates with migrated virtual machine 30m using the activated shadow policy.

A shadow policy mechanism is established on all hosts that are participating in the specified virtual network, or isolation group, or that will participate in that virtual network after the live migration. Each host that hosts one or more virtual machines in the virtual network already has a current policy that associates the customer address with the provider address. Each of those hosts is now provided with a shadow policy, not yet in force, that associates the customer address with the new provider address of the migrated virtual machine. The shadow policy can be triggered to replace the current policy, either manually or automatically. The shadow policy may have a time-to-live (TTL) that allows it to expire after a certain interval if not activated. The shadow policy is also given to the new host, the host that receives the migrating virtual machine. In the case of the new host, the shadow policy may not replace an existing policy because the new host may not yet be hosting a member of the virtual network.

The following are special cases of the shadow policy. In a first special case, the virtual machine being migrated may be the only virtual machine on the source host (first host 12) that is in the virtual network of interest. After migration, the source host no longer has a virtual machine in the virtual network. When the current policy expires, it is not directly replaced by the shadow policy since the source host will no longer need the policy for that virtual network. A second special case occurs when the shadow policy is applied to the new host. In this case, the shadow policy has no current policy to shadow. The shadow policy merely goes into force when triggered.

When the shadow policy is applied to the source host for the live migration (first host 12), a forwarding policy is created. The purpose of the forwarding policy is to forward to the new physical address packet traffic addressed to the virtual machine at the old physical address. This ensures that gaps in reachability do not occur following the live migration. The forwarding policy may be part of the shadow policy on the source host. The forwarding policy goes into effect as soon the shadow policy is triggered in the source host and remains in effect until all hosts in the virtual network have activated the shadow policy.

When a rapid transition such as live migration occurs, the source host is informed as part of the process. The target host (second host 14) will begin receiving packets from the source host and can immediately activate the shadow policy. Communication, for example, between virtual machine 40 and migrated virtual machine 30m results in packets being forwarded from the source host to the target host.

When a reply is sent from migrated virtual machine 30m to virtual machine 40, the packet is sent from the new provider address $LA_{18}$ to the sender (not using reverse tunneling). When third host 16 of virtual machine 40 receives the inbound packet, there is no active policy that allows a packet from virtual machine 30 at provider address $LA_{18}$. Instead, third host 16 has a policy allowing a packet from provider address $LA_1$. However, the shadow policy does allow a packet from migrated virtual machine 30m at provider address $LA_{18}$. Receipt of this packet automatically triggers the shadow policy to replace the current policy. A subsequent packet from virtual machine 40 to virtual machine 30 uses the new provider address $LA_{18}$ of migrated virtual machine 30m. This automatic policy replacement minimizes use of the forwarding policy in active conversations, thus reducing network utilization, congestion and possibly errors.

Not all policy replacement can be automatic. There are some communication patterns that are unidirectional, such as UDP announcements. The lack of a response message precludes automatic replacement. Also, some virtual machine pairs will not be engaged in any monologue or dialog, so automatic replacement is not possible. In this case, the virtual machine manager 22 can trigger policy replacement after the live migration has completed. This triggering is not time critical and can be staggered. When the shadow policy has replaced the current policy on all hosts of the virtual network, the forwarding policy can be deactivated.

Figure 11:
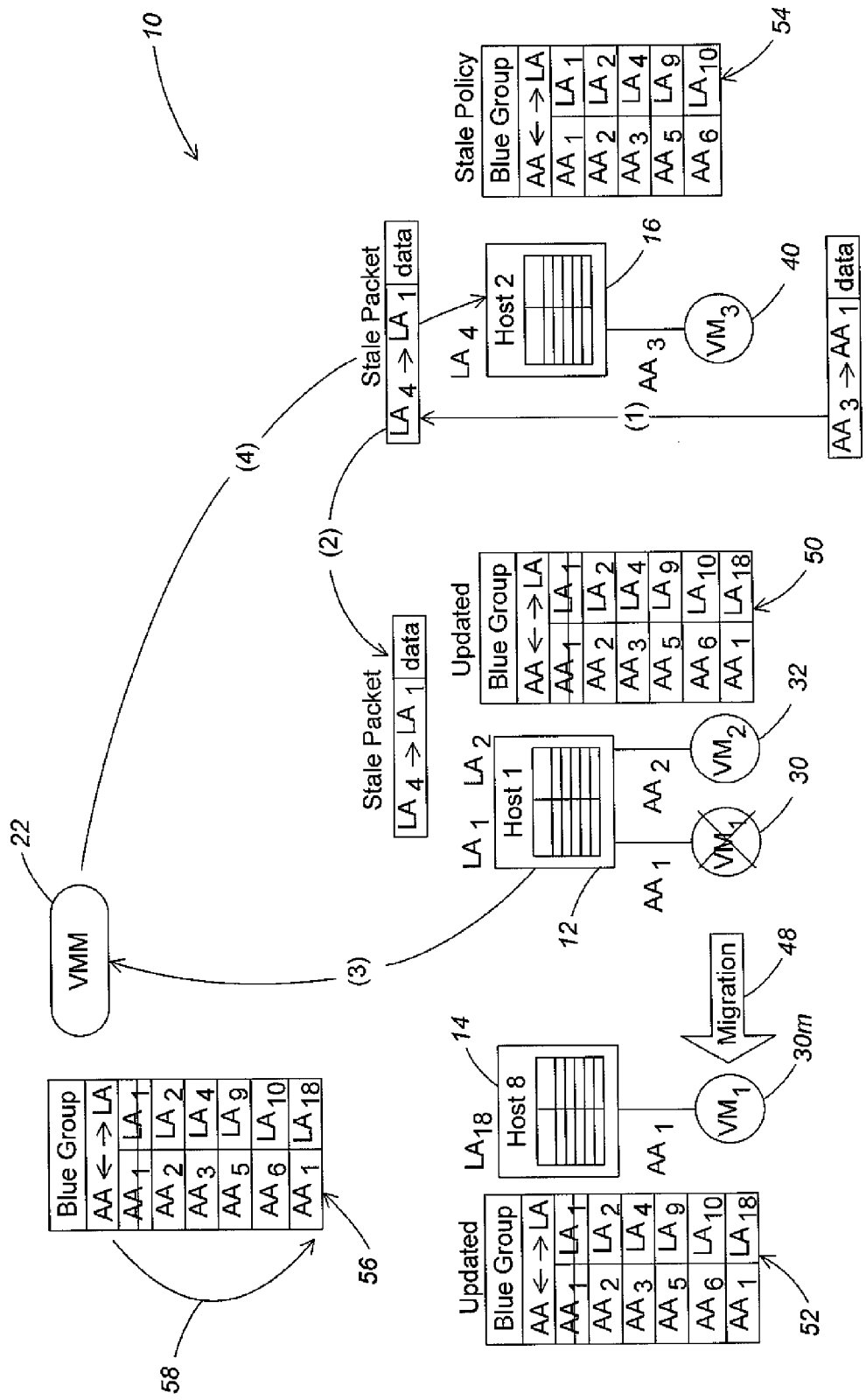
FIG. 11 is a schematic block diagram of a data center, illustrating reactive policy updating according to a lazy push technique.
Figure 12:
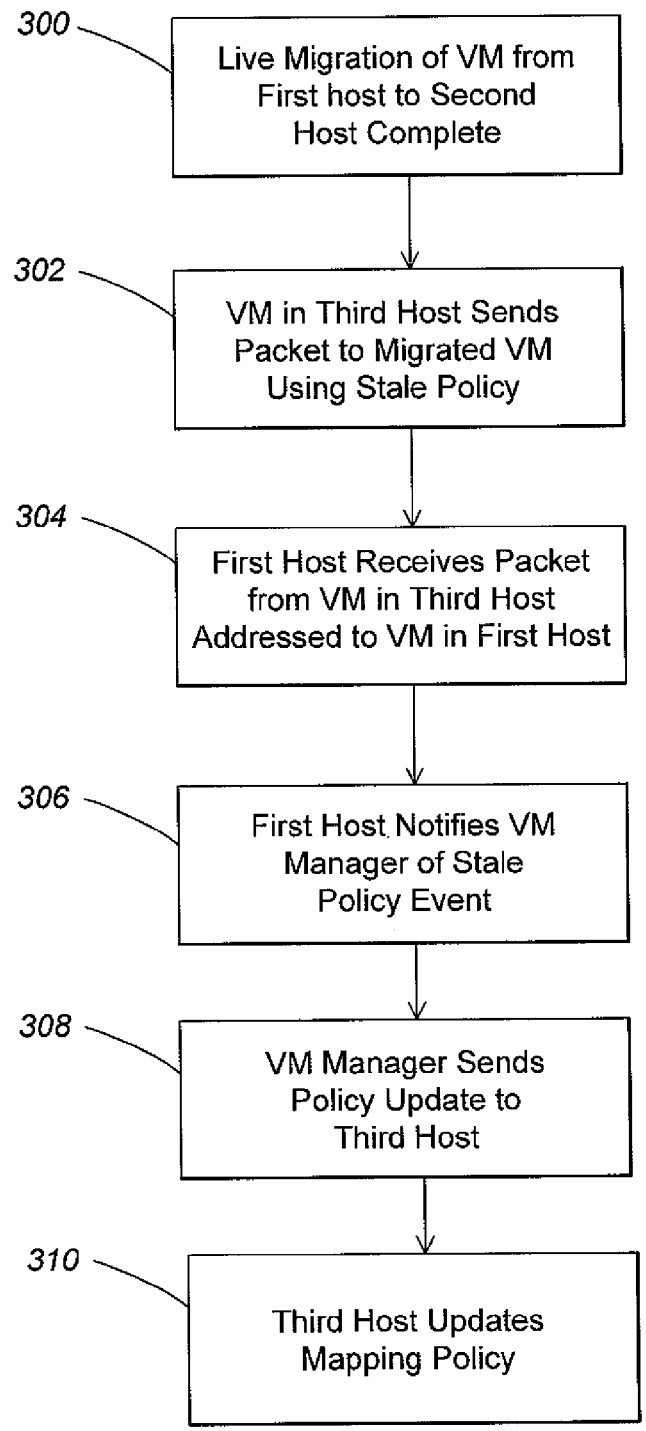
FIG. 12 is a flowchart that illustrates reactive policy updating according to the lazy push technique.

Policy updating in accordance with further embodiments of the invention is shown in FIGS. 11 and 12. FIG. 11 is a simplified schematic block diagram of data center 12, illustrating reactive policy updating according to a lazy push technique. The components of data center 10 in FIG. 11 correspond with the components of data center 10 shown in FIG. 4, except that data center network fabric 20 has been omitted for simplicity. A flow diagram of reactive policy updating according to the lazy push technique is shown in FIG. 12. It is assumed that first host 12, second host 14 and virtual machine manager 22 have updated mapping policies that reflect the migration of virtual machine 30 from first host 12 to second host 14. The mapping policy in policy table 54 of third host 16 is stale and does not reflect the migration of virtual machine 30.

In act 300, the live migration of virtual machine 30 from first host 12 to second host 14 is determined to be complete. In act 302, virtual machine 40 in third host 16 sends a packet addressed to virtual machine 30 using the stale mapping policy in policy table 54 (arrow (1) in FIG. 11). In act 304, first host 12 receives the packet sent from virtual machine 40 in third host 12 and addressed to virtual machine 30 (arrow (2) in FIG. 11). However, virtual machine 30 has migrated to second host 14. The first host 12 may perform forwarding of the packet as described above in connection with FIGS. 4 and 5.

In act 306, the first host 12 notifies the virtual machine manager 22 of a stale policy event, i.e., receiving a packet from third host 16 with accordance with a stale mapping policy (arrow (3) in FIG. 11). In act 308, the virtual machine manager 22 sends a policy update to third host 16 (arrow (4) in FIG. 11) to update its mapping policy to reflect migrated virtual machine 30m. In act 310, third host 16 updates its mapping policy and thereafter communicates with migrated virtual machine 30m in accordance with the updated mapping policy.

Figure 13:
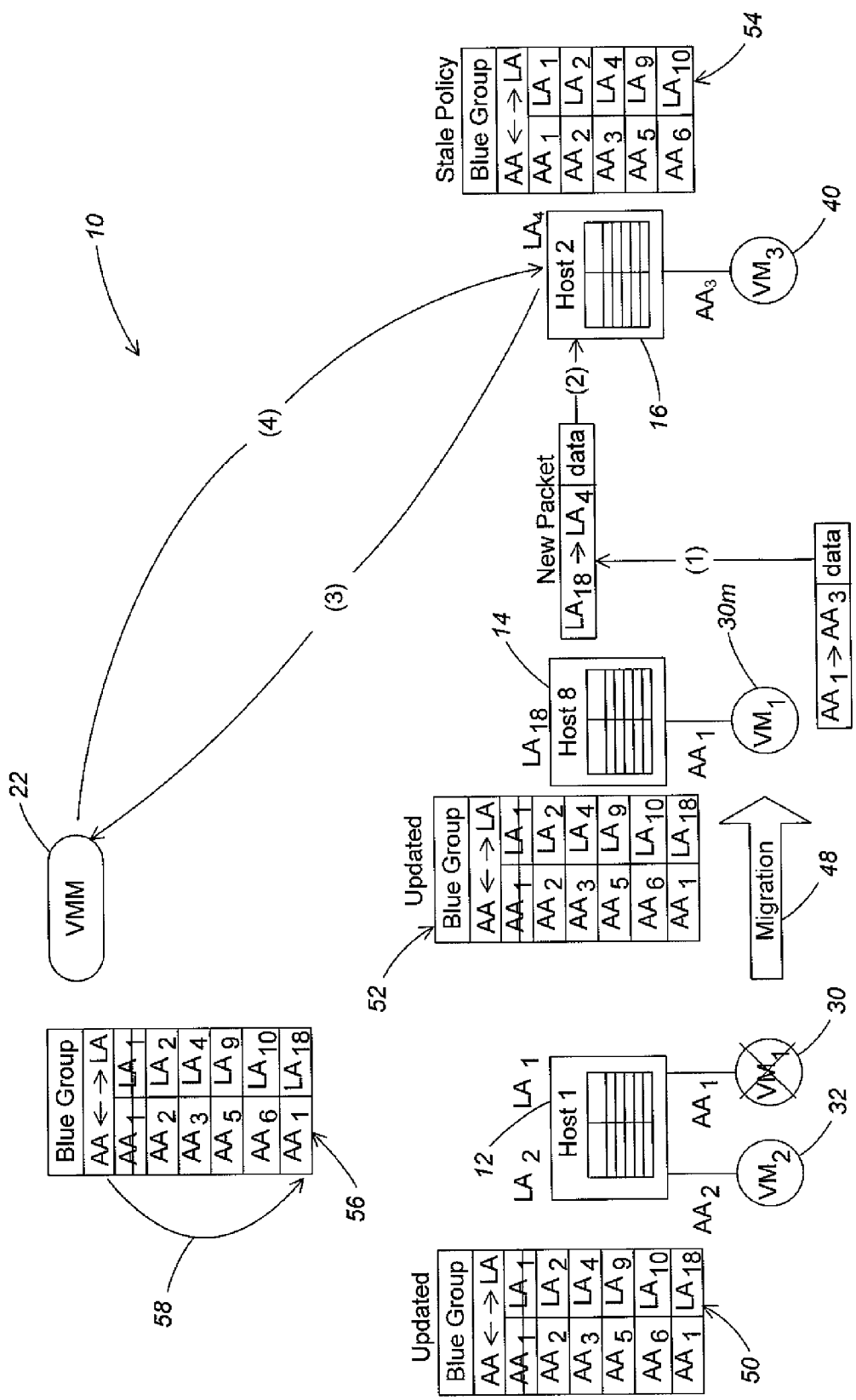
FIG. 13 is a schematic block diagram of a data center, illustrating reactive policy updating according to a lazy pull technique.
Figure 14:
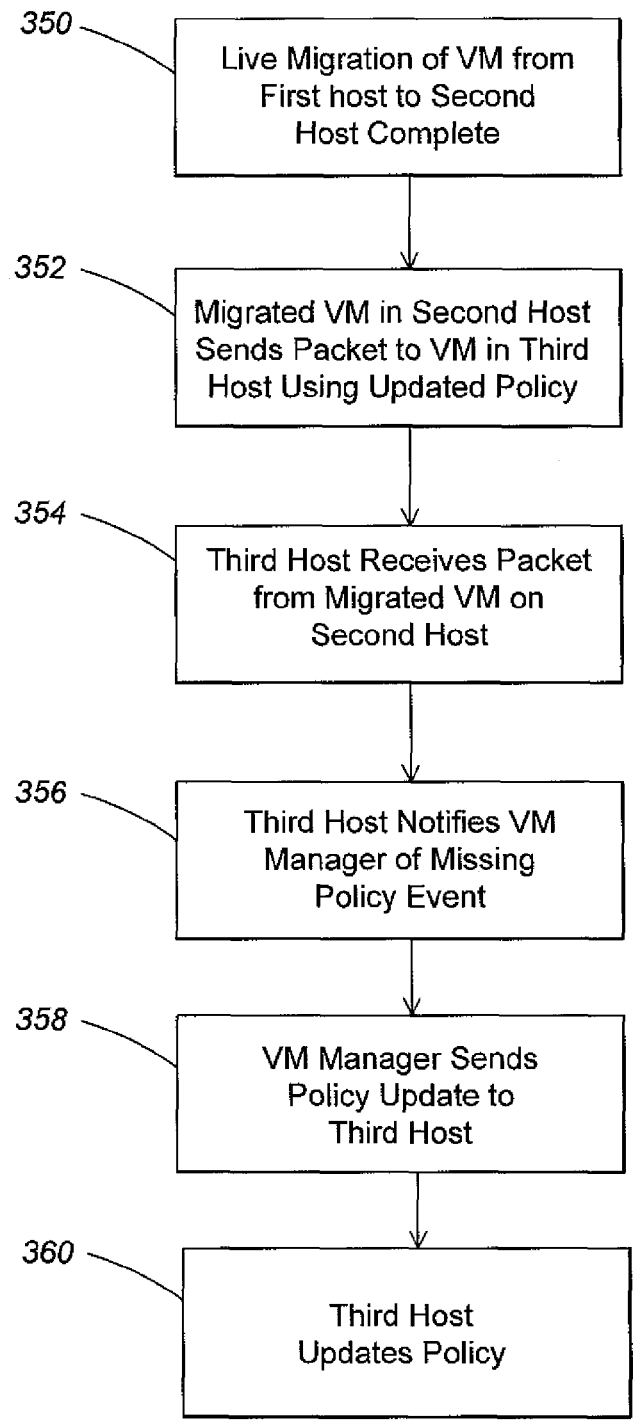
FIG. 14 is a flowchart that illustrates reactive policy updating according to the lazy pull technique.

FIG. 13 is a simplified schematic block diagram of data center 10, illustrating reactive policy updating according to a lazy pull technique. Components of data center 10 in FIG. 13 correspond with the components of data center 10 shown in FIG. 4, except that data center network fabric 20 has been omitted for simplicity. It is assumed that first host 12, second host 14 and virtual machine manager 22 have updated mapping policies that reflect the migration of virtual machine 30 from first host 12 to second host 14. The mapping policy in policy table 54 in third host 16 is stale and does not reflect the migration of virtual machine 30.

In act 350, live migration of virtual machine 30 from first host 12 to second host 14 is determined to be complete. In act 352, migrated virtual machine 30m in second host 14 sends a packet to virtual machine 40 in third host 16 (arrow (1) in FIG. 13) using the updating mapping policy. In act 354, third host 16 receives the packet from migrated virtual machine 30m in second host 14 (arrow (2) in FIG. 13).

In act 356, third host 16 recognizes the incoming packet as not matching the mapping policy in policy table 54. Third host 16 then notifies the virtual machine manager 22 of a stale policy event (arrow (3) in FIG. 13). In act 358, the virtual machine manager 22 sends to third host 16 a policy update for migrated virtual machine 30m (arrow (4) in FIG. 13). In act 360, third host 16 updates the mapping policy for migrated virtual machine 30m and thereafter accepts packets from migrated virtual machine 30m in accordance with the updated mapping policy.

The invention has been described in connection with live migration of a virtual machine from one provider address to another provider address. However, the invention may be utilized in connection with any rapid transition of a virtual machine from one provider address to another provider address.

Figure 15:
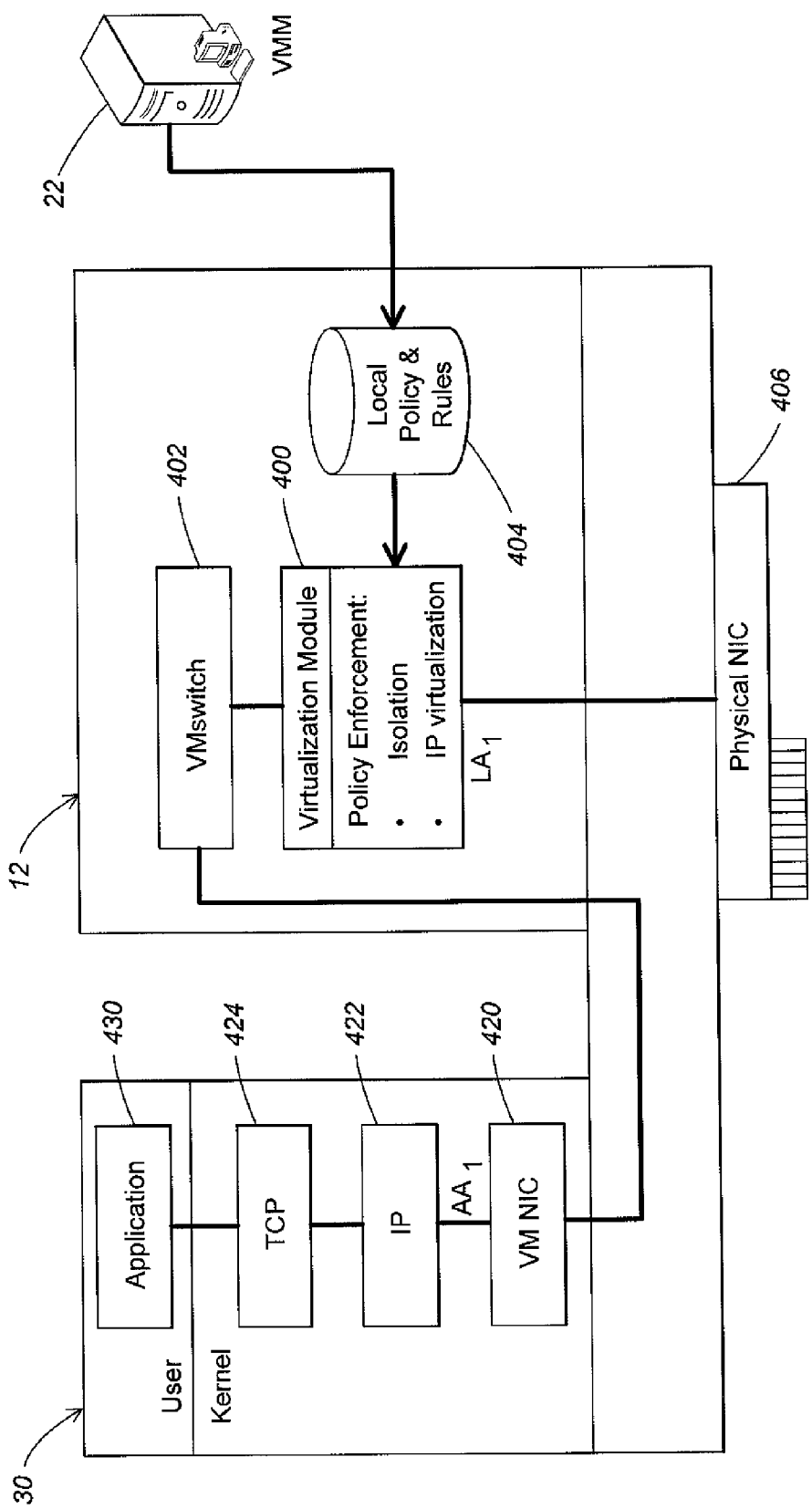
FIG. 15 is a schematic block diagram of a host and a virtual machine.

FIG. 15 is a schematic diagram of first host 12 and virtual machine 30 in accordance with embodiments of the invention. First host 12 may include a virtualization module 400, a VM switch 402, a storage device 404 and a physical NIC (Network interface card) 406. Virtual machine 30 may include VM NIC 420, a IP (Internet Protocol) module 422, a TCP (Transmission Control Protocol) module 424 and a user application 430.

The virtualization module 400 may control communication to and from virtual machine 30 as described herein, including but not limited to one or more of implementing and updating the virtual network policy contained in storage device 404, implementing the shadow policy and shadow policy activation, implementing the forwarding policy, implementing the reverse tunneling policy, implementing the lazy push technique and implementing the lazy pull technique. The storage device 404 contains one or more virtual network policies, and VM switch 402 routes packets to and from virtual machine 30 and other virtual machines hosted by first host 12. It will be understood that first host 12 may have a different configuration and that other hosts in data center 10 may have the same or different configurations within the scope of the invention.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of a computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

Figure 16:
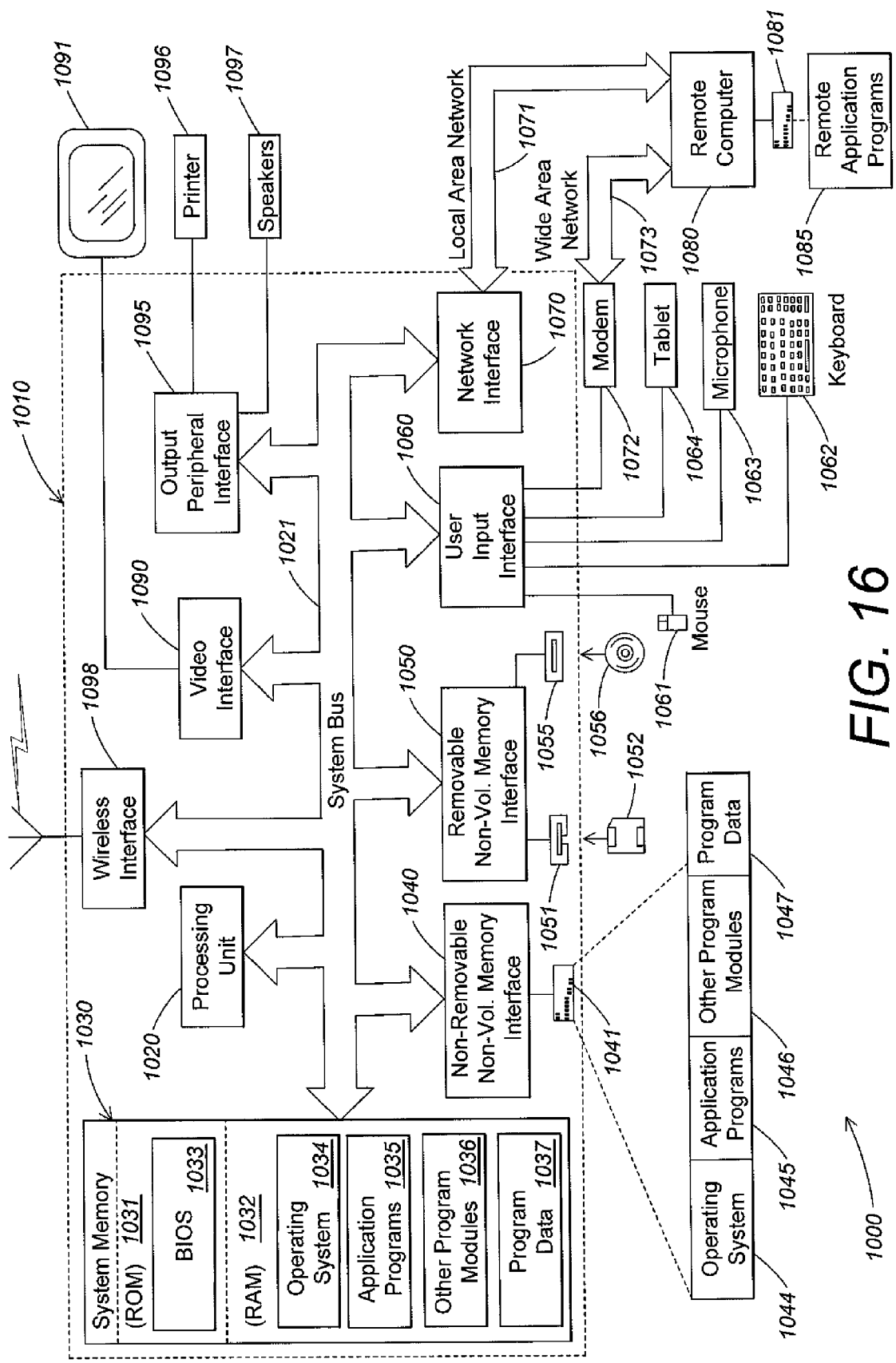
FIG. 16 is a schematic block diagram of an embodiment of a computing device.

With reference to FIG. 16, an exemplary system for implementing the invention includes a general purpose computing device in the form of a computer 1010. The computing device of FIG. 16 can be used for implementing the hosts, the virtual machine manager and any other computing devices described herein. Components of computer 1010 may include, but are not limited to, a processing unit 1020, a system memory 1030, and a system bus 1021 that couples various system components including the system memory to the processing unit 1020. The system 1021, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Combinations of the any of the above should also be included within the scope of computer readable storage media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 16 illustrates operating system 1034, application programs 1035, other program modules 1036, and program data 1037.

The computer 1010 may also include other removable/non-removable volatile/nonvolatile computer storage media. By way of example only, FIG. 16 illustrates a hard disk drive 1040 that reads from or write to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, discussed above and illustrated in FIG. 16, provide storage of computer readable instructions, data structures, program modules and other data for the computer 1010. In FIG. 16, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices may include a microphone 1063, joystick, a tablet 1064, satellite dish, scanner, or the like. These and other input devices are often connected to the processing unit 1020 through a user input interface 1060 that is coupled to the system bus, but may not be connected by other interface and bus structures, such as a parallel port, game port or a universal serial bus (USB). A monitor 1091 or other type of display device is also connected to the system 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 15. The logical connections depicted in FIG. 16 include a local area network (LAN) 1071 and a wide area network (WAN) 1073 and a wireless link, for example via a wireless interface 1098 complete with an antenna, but may also include other networks. Such networking environments are commonplace in offices, enterprise-wide computer networks, intranets and the Internet. While wireless interface 1098 is shown directly connected to system bus 1021, it is recognized that the wireless interface 1098 may be connected to system bus 1021 via network interface 1070.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 16 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for controlling live migration of a virtual machine from a first host to a second host, the method comprising:

executing, by the first and second hosts, respective virtualization modules, the first and second hosts among a plurality of hosts with respective virtualization modules, the virtualization modules managed by a virtual machine manager, each host having a respective host network address and having virtual machines with respective virtual network addresses, wherein the hosts exchange packets via a network using their respective host network addresses;

prior to a determination to migrate a virtual machine, storing instances of a first mapping policy on the plurality of hosts, respectively, wherein each instance of the first mapping policy comprises the virtual network addresses and the host network addresses, wherein each instance of the first mapping policy indicates which of the virtual network addresses therein are associated with which of the host network addresses therein, and wherein prior to the determination to migrate the virtual machine, each virtualization module handles incoming packets from the network addressed to its host network address and handles outgoing packets sent by its virtual machines to other virtual network addresses, and prior to the determination to migrate the virtual machine, each virtualization module uses a respective instance of the first mapping policy to determine which of its virtual machines are to receive which of the incoming packets, and during the migration and prior to the determination to migrate the virtual machine, each virtualization module uses a respective instance of the first mapping policy to determine which host network addresses to send the outgoing packets to;

making the determination, by the virtual machine manager, to migrate the virtual machine, wherein the virtual machine is determined to be migrated from the first host to the second host;

responsive to and in conjunction with the determination to migrate the virtual machine, and prior to completion of the migrating, sending, to the hosts in the plurality, respective instances of a second mapping policy comprising the virtual network address of the virtual machine and the host network address of the second host, each instance of the second mapping policy indicating that the virtual network address is associated with the host network address of the second host, wherein during the migration the instances of the second mapping policy are in an inactive state;

after migration of the virtual machine completes, notifying the plurality of hosts to activate their respective instances of the second mapping policy for communicating with the virtual machine;

in response to the notifying, the instances of the second mapping policy begin entering active use by the plurality of hosts for communicating with the virtual machine; and in response to the notifying, forwarding, by the first host, any packets for the virtual machine that are received by the first host while the instances of the second mapping policy are entering active use.

2. The method as defined in claim 1, wherein the notifying the plurality of hosts is performed by the virtual machine manager, the virtual machine manager controlling operations of the virtualization modules, the controlling including making determinations to initiate VM migrations and correspondingly transmitting migration commands to the virtualization modules.

3. The method as defined in claim 2, further comprising the virtual machine manager notifying the first host responsive to the virtual machine manager determining that all hosts in the virtual network have activated the second mapping policy.

4. The method as defined in claim 1, wherein sending the instances of the second mapping policy comprises sending the second mapping policy to the third host in response to a request by the first host.

5. The method as defined in claim 1, wherein sending the instances of the second mapping policy comprises sending the second mapping policy to the third host in response to a request by the third host.

6. The method as defined in claim 1, further comprising, after the virtual machine has finished migrating to the second host: the first host receiving a packet addressed to the virtual machine on the first host, and, according to a forwarding mapping policy, forwarding the received packet to the virtual machine on the second host.

7. The method as defined in claim 1, further comprising, after the virtual machine has been migrated, receiving, by the first host, a packet from the virtual machine and forwarding the received packet to a destination host.

8. A method for facilitating live migration of a virtual machine from a first host to a second host, the method comprising:

executing, by the first host, the second host, and a third host, respective virtualization modules that manage virtual machines on the first, second, and third hosts, the virtual machines having respective customer addresses in a customer address space, the first, second, and third hosts having respective provider addresses in a provider address space, wherein each host maintains and stores a respective instance of a first mapping policy, each instance of the first mapping policy comprising network addresses, in the customer address space, of respective virtual machines, paired with respective network addresses, in the provider address space, of hosts hosting the virtual machines, and wherein, prior to initiating a live migration, each virtualization module uses a respective instance of the first mapping policy to exchange packets sent between the virtual machines, wherein the first mapping policy comprises the customer address of the virtual machine paired with the provider address of the first host;

receiving and storing, by each host, an inactive second mapping policy that comprises the customer address of the virtual machine and the provider address of the second host paired with the customer address of the virtual machine, wherein the customer address of the virtual machine is in the customer address space and is stored in the instances of the second mapping policy, and wherein the provider address of the second host is in the provider address space and is stored in the instances of the second mapping policy;

before and during the live migration of the virtual machine, using, by the third host, the instance of the first mapping policy stored thereon for communicating with the virtual machine until the second mapping policy is activated;

receiving, by the third host, a packet matching the second mapping policy, and, in response to receiving the packet matching the second mapping policy, activating the second mapping policy; and using, by the third host, the second mapping policy stored thereon for communicating with the virtual machine after the second mapping policy is activated.

9. The method as defined in claim 8, further comprising receiving, by the third host, a notification to activate the second mapping policy.

10. The method as defined in claim 8, further comprising causing the second mapping policy to expire if not activated by an expiration time.

11. A virtual machine manager for controlling live migration of a virtual machine from a first host to a second host in a data center comprised of hosts and a network, the hosts having respective virtualization components for virtual machines, the hosts including the first host and the second host, the virtual machine manager comprising:

a processing hardware device and a storage hardware device encoded with instructions that, when executed by the processing device, are configured to:

provide a mapping policy that is stored on each of the hosts, the mapping policy comprising customer addresses of each of the respective virtual machines and provider addresses of each of the hosts respectively paired with the customer addresses of the virtual machines, wherein, prior to a determination to migrate the virtual machine, the virtualization components of the hosts use the mapping policy stored on the hosts to route provide packets from the network to their respective virtual machines and use the mapping policy stored on the hosts to send packets from their respective virtual machines via the network to the hosts;

make the determination to migrate the virtual machine from the first host to the second host; and responsive to the determination to migrate the virtual machine and before migration of the virtual machine completes, send, to the hosts, an updated mapping policy that comprises a customer address of the virtual machine and comprises a provider address of the second host paired with the customer address of the virtual machine, the updated mapping policy stored in an inactive state on each host until being activated, wherein the updated mapping policy is activated, by the virtual machine manager, responsive to the virtual machine having finished migrating to the second host, the updated mapping policy on a third host to be used, when activated, by the virtualization component on the third host, to determine that packets sent to the virtual machine by a virtual machine on the third host are to be sent to the provider address of the second host.

12. The virtual machine manager as defined in claim 11, further configured to send to the first host, as part of a process of starting the migration of the virtual machine, a redirect message comprising a pairing of the provider address of the first host and the provider address of the second host, the first host responding to the redirect message by beginning to redirect, to the second host, any packets received via the network for the virtual machine.

13. The virtual machine manager as defined in claim 12, further configured to send to a plurality of the hosts, including the third host, a notification to activate the updated mapping policy.

14. The virtual machine manager as defined in claim 13, further configured to determine when all of the hosts in the plurality of hosts have activated the updated mapping policy, and in response send a notification to the first host.

15. The virtual machine manager as defined in claim 11, further configured to send the updated mapping policy to the third host in response to a request by the first host.

16. The virtual machine manager as defined in claim 11, further configured to send the updated mapping policy to the third host in response to a request by the third host.

17. The virtual machine manager as defined in claim 11, wherein the instructions are further configured to initiate and control migrations of any of the virtual machines on any of the hosts.

* * * * *